Nov. 7, 1961　　　K. LEHOVEC　　　3,007,992

BATTERY CELL STRUCTURE

Filed Sept. 23, 1958

INVENTOR
KURT LEHOVEC

BY *Connolly and Hutz*

ATTORNEYS

United States Patent Office 3,007,992
Patented Nov. 7, 1961

3,007,992
BATTERY CELL STRUCTURE
Kurt Lehovec, Williamstown, Mass., assignor to Sprague Electric Company, North Adams, Mass., a corporation of Massachusetts
Filed Sept. 23, 1958, Ser. No. 762,878
6 Claims. (Cl. 136—83)

This invention relates to a structure for a solid barrier-electrolyte battery cell and, more particularly, to such a cell for providing relatively high currents.

A solid electrolyte battery cell, for example, of the general type described in U.S. Letters Patent 2,690,465 incorporates a highly reactive cathode material, for example, iodine which emits extremely corrosive vapors. This material must, therefore, be hermetically sealed within the cell. A highly successful structure for cells providing relatively low currents in the range of a few microamperes and less is described, for example, in commonly assigned, co-pending application Serial No. 657,178, filed May 6, 1957, issued on September 20, 1960, as Patent Number 2,953,620.

However, when relatively higher currents, for example, in the milliampere range, are required, the cup-type or the older flat-disc type of cell becomes too bulky if the area of respective elements are merely proportionately increased. Other configurations for cells providing relatively higher currents have been suggested, but these structures are not as easy to manufacture and seal as the cup-type cells.

An object of this invention is to provide a compact and convenient structure for a relatively high current solid electrolyte battery cell.

Another object is to provide such a structure that is simple and economical to manufacture and seal.

In accordance with this invention, a relatively long and thin tubular anode is filled with cathode material. An elongated conductive lead extends through sealing means inserted into the end of the tubular anode substantially throughout the entire length of the tubular anode. A particularly advantageous cell of this type utilizes a sealing plug inserted into both ends of the tubular anode with the lead extending through holes in the center of the plugs outside of both ends of the tubular anode.

Novel features and advantages of the present invention will become apparent to one skilled in the art from a reading of the following description in conjunction with the accompanying drawings in which similar reference characters refer to similar parts and in which.

Figure 1:
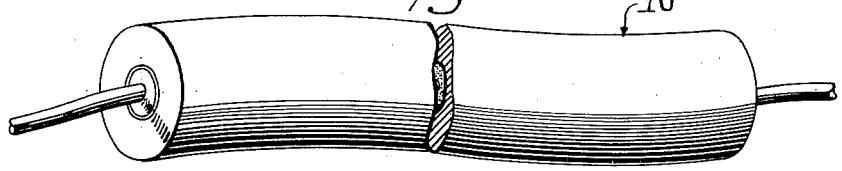
FIG. 1 is a perspective view of one embodiment of this invention.
Figure 2:
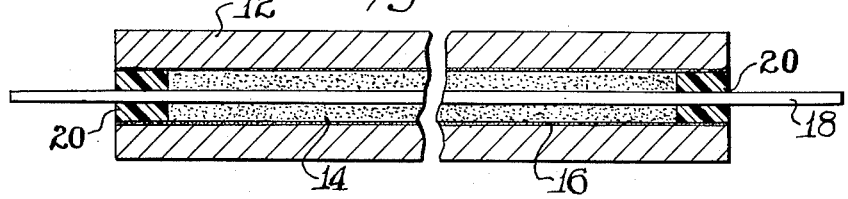
FIG. 2 is a longitudinal cross-sectional view of the embodiment shown in FIG. 1.

In FIGS. 1 and 2 is shown a solid electrolyte battery cell 10 incorporating a tubular anode 12, for example, made of silver. Tubular anode 12 is relatively long in comparison to its inside and outside diameters, for example, being several inches long, 4 inches for example, and having an inside diameter of 50 mils and an outside diameter of approximately 125 mils.

Tubular anode 12 is filled with a cathode material, for example, a mixture of iodine and a conductive matrix, for example, finely ground carbon. A suitable binder is added to this mixture before it is deposited within the tubular anode. A suitable binder is, for example, a grease such as Kel-F grease, which is a polymer of trifluorochloroethylene grease made and sold under the trademark Kel-F.

Other useful cathode materials are, for example, chlorine or a material incorporating a polyhalide anion including an available halogen such as chlorine coordinated or co-valently bonded to the central halogen atom may be utilized. A material of this type, such as potassium tetrachloroiodide has the advantage of dissociating to liberate its chlorine gradually at a relatively low vapor pressure.

The interior of anode 12 is, for example, pretarnished to provide a solid barrier-electrolyte coating 16, for example, of silver chloride by tarnishing in chlorine vapor. Pretarnishing is, for example, utilized to provide an advantageous silver chloride barrier-electrolyte layer when iodine, for example, is used in cathode mixture 14. However, when the cathode material liberates chlorine, this barrier-electrolyte layer is automatically formed when the cathode material contacts the inner surface of the tube 12; but even if the cathode material liberates chlorine, pretarnishing can help conserve the active cathode material.

An elongated conductive lead 18 made, for example, of 10 mil corrosion-resistant tantalum wire is inserted within the cathode material and extends substantially through the entire length of the tube.

The ends of tube 12 are sealed, for example, by plugs 20 of inert material, for example, made of a solid polymer sold under the trademark Teflon or Kel-F. Teflon is a tetrafluoroethylene polymer and Kel-F is a thermoplastic polymer of a trifluorochloroethylene. A plug of either of these materials effectively seals when it is assembled by means of a reasonably firm press fit with lead 18 extending through it and the mouth of tube 12 into which it is inserted.

Extending lead 18 through holes of substantially equivalent diameters passing through plugs 20 at both ends of tube 12 effectively spaces lead 18 from tube 12 at both ends which prevents short-circuiting as well as allowing lead 18 to extend throughout the entire length of the cell.

After tubular battery element 10 has been formed in the straight form as shown in FIGS. 1 and 2, it may be formed or wound into various shapes to conserve volume and make the resultant cell relatively compact.

Figure 3:
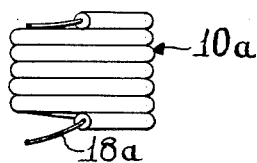
FIG. 3 is a front view in elevation of a shaped form of the embodiment shown in FIG. 1.

FIG. 3, for example, shows a cell 10a wound into a cylindrical spiral form.

Figure 4:
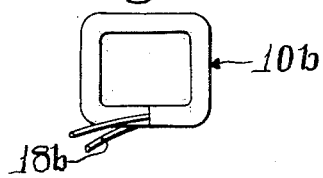
FIG. 4 is a plan view of another shaped form of the embodiment shown in FIG. 1.
Figure 6:
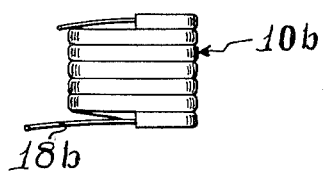
FIG. 6 is a front view in elevation of the embodiment shown in FIG. 4.

FIGS. 4 and 6 show another cell 10b shaped in the form of a rectangular spiral. This rectangular spiral is formed, for example, by either winding directly in rectangular spiral form or by winding in a cylindrical spiral and deforming to the rectangular form.

Figure 5:
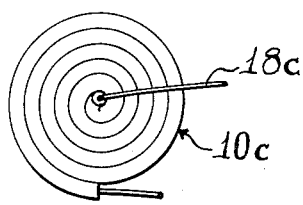
FIG. 5 is a plan view of a further shaped form of the embodiment shown in FIG. 1.
Figure 7:
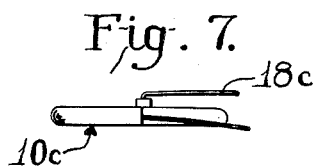
FIG. 7 is a front view view in elevation of the embodiment shown in FIG. 5.

FIGS. 5 and 7 show still another shaped cell 10c which is wound into a flat spiral. These flat spiral cells can be, for example, conveniently assembled side by side.

Solid electrolyte battery cells made in this form have several advantages, the most important of which is the ease of sealing which is facilitated by the unprecedented high ratio between the effective cell area and sealing element area. This unusual sealing effectiveness is illustrated by the fact that a battery cell of this type survived for 6 months in storage without deterioration even though one of its sealing plugs had slipped out.

A cell of this type also provides highly effective electrical characteristics as illustrated by the fact that a cell of the aforementioned structure having a 4 inch tubular silver anode of 50 mil I.D. and 125 mil O.D., and having the aforementioned cathode mixture incorporating chlorine, provides an E.M.F. of 1.04 volts without load, and has an internal resistance of 25 kiloohms.

The coulombic capacity of cells of this type expressed in coulombs per cubic centimeter is, for example, 2,330 for a silver iodide cell and 3,800 for a silver chloride cell. This illustrates the relatively high current providing ability of this type of cell.

What is claimed is:

1. A structure for a solid electrolyte battery cell comprising a tubular anode which is relatively long in comparison to its inside and outside diameters, cathode material disposed within the tubular anode, a sealing plug made of substantially inert material disposed within each open end of said tubular anode for confining said cathode material within said tube, an elongated conductive lead extending through both of said sealing plugs into contact with said cathode material substantially throughout the entire length of said tubular anode, said tubular anode being made of a material which is sufficiently ductile to impart enough flexibility to its relatively long length to permit said anode to be wrapped in a compact form, and said tubular anode being wrapped in a compact configuration to minimize the space occupied by said solid electrolyte battery cell.

2. A structure as set forth in claim 1 wherein said plug is comprised of a press-fitted plastic selected from the group consisting of Teflon and Kel-F.

3. A structure as set forth in claim 1 wherein one of said plugs is inserted within each end of said tubular anode.

4. A structure as set forth in claim 1 wherein said cell is wound in a spiral form.

5. A structure as set forth in claim 1 wherein said cell is wound in a rectangular spiral form.

6. A structure as set forth in claim 1 wherein said cell is wound in a flat disc form.

References Cited in the file of this patent

UNITED STATES PATENTS

| | | |
|---|---|---|
| 1,617,218 | Newth et al. | Feb. 8, 1927 |
| 2,057,790 | Potter et al. | Oct. 20, 1936 |
| 2,592,439 | Lee | Apr. 8, 1952 |
| 2,696,513 | Lehovec | Dec. 7, 1954 |
| 2,747,009 | Kirkwood et al. | May 22, 1956 |

FOREIGN PATENTS

| | | |
|---|---|---|
| 103,618 | Great Britain | Feb. 1, 1917 |